United States Patent [19]

Tsuneki

[11] Patent Number: 4,660,999
[45] Date of Patent: Apr. 28, 1987

[54] DOT-MATRIX PRINTER WITH FONT CARTRIDGE UNIT

[75] Inventor: Yukio Tsuneki, Hanno, Japan

[73] Assignee: Kabushiki Kaisha Toshiba, Kawasaki, Japan

[21] Appl. No.: 770,995

[22] Filed: Aug. 30, 1985

[30] Foreign Application Priority Data

Aug. 31, 1984 [JP] Japan .................. 59-181871

[51] Int. Cl.⁴ .......................................... B41J 5/30
[52] U.S. Cl. .................................... 400/61; 400/70; 400/121; 400/692; 364/519; 365/63
[58] Field of Search ............ 400/61, 62, 70, 692, 400/121, 124; 365/63, 105; 235/419; 307/154; 339/17 LC, 17 M, 17 CF; 364/519

[56] References Cited

U.S. PATENT DOCUMENTS

| | | | |
|---|---|---|---|
| 4,159,541 | 6/1979 | Ward | 365/191 X |
| 4,281,938 | 8/1981 | Phillips | 400/150 X |
| 4,388,010 | 6/1983 | Mott | 400/692 |
| 4,452,136 | 6/1984 | Boynton | 400/70 X |

FOREIGN PATENT DOCUMENTS

| | | | |
|---|---|---|---|
| 42206 | 12/1981 | European Pat. Off. | 400/175 |
| 110632 | 6/1984 | European Pat. Off. | 400/61 |

OTHER PUBLICATIONS

*Introduction to Microcomputers,* by Adam Osborne, 1980, pp. 5–6, Osborne/McGraw-Hill, vol. 1, Basic Concepts, Second Edition.

*Primary Examiner*—Paul T. Sewell
*Attorney, Agent, or Firm*—Finnegan, Henderson, Farabow, Garrett and Dunner

[57] ABSTRACT

A dot-matrix printer of the invention uses a font cartridge unit storing in advance character pattern data corresponding to characters other than standard characters. The font cartridge unit has a memory area divided into a plurality of page areas, and comprises memory groups consisting of ROMs and RAMs storing character pattern data in units of page areas. A CPU sets a predetermined page address in a page address register in the font cartridge unit when dot printing of characters other than standard characters is performed. The CPU reads out desired character pattern data from the page area of the memory group corresponding to the preset page address. The CPU recognizes that no ROM is mounted at a position corresponding to the page area when predetermined data cannot be read out from the ROM. The CPU writes the predetermined data in the predetermined page area, and thereafter, when the predetermined page area is accessed, if the predetermined data cannot be read out, the CPU determines that no RAM is mounted at a position corresponding to the page area.

12 Claims, 8 Drawing Figures

DOT-MATRIX PRINTER WITH FONT CARTRIDGE UNIT

BACKGROUND OF THE INVENTION

The present invention relates to a dot-matrix printer with a font cartridge which reads out character pattern data stored in advance in a memory mounted in the font cartridge, and prints in accordance with the character pattern data.

In order to print a plurality of types of font of characters, dot-matrix printers must have a read-only memory (ROM) storing character pattern data of each font. However, different fonts are usually used in different countries. For this reason, when dot-matrix printers mount a ROM storing character pattern data for each country, a ROM having a considerable memory capacity is required, resulting in high cost. In order to overcome such a drawback, a plurality of font cartridges mounting ROMs or random-access memories (RAMs) storing a plurality of font of character pattern data are prepared, and the desired font cartridge is mounted on the dot-matrix printer so as to read out character pattern data of a desired font for printing. However, with this method, when the font cartridge is mounted on the dot-matrix printer, a control circuit of the printer cannot recognize in which address area of the font cartridge a memory is mounted, or whether a ROM or a RAM is mounted. Therefore, it requires a complex operation and extra time for this recognition.

SUMMARY OF THE INVENTION

It is an object of the present invention to provide a dot-matrix printer with a font cartridge, in which a font cartridge mounting a memory storing character pattern data of a plurality of fonts is prepared, a memory mounting state in the font cartridge can be easily recognized, and characters in addition to standard characters of the printer can be printed.

In order to achieve the above object, there is provided a dot-matrix printer with a font cartridge unit having the following arrangement. According to the present invention, a dot-matrix printer with a font cartridge unit comprises:

a font cartridge unit comprising a plurality of read-only memories or read/write memories, having a memory area divided into a plurality of page areas, for storing various character pattern data in each page area, and an input/output bus for inputting or outputting the character pattern data read out from the read-only memories or the read/write memories;

detecting means for accessing a predetermined address of each page area of the font cartridge unit through the input/output bus so as to detect a mounting state of the read only memories or the read/write memories corresponding to the respective page areas in accordance with a content of accessed specific read data;

print control means for forming print data in accordance with the character pattern data read out from the read-only memories or the read/write memories mounted in the font cartridge unit in accordance with the detection result of the detecting means;

connector means for connecting the input/output bus of the font cartridge unit to the print control means and the detecting means so as to transfer data between the input/output bus and the print control means or to transfer the specific read data between the input/output bus and the detecting means; and print means for executing a dot-print operation in accordance with the print data formed by the print control means.

With the above arrangement, a dot-matrix printer can detect a memory arrangement of a character pattern memory in a font cartridge unit. Therefore, the printer main body can recognize a storage area corresponding to predetermined character pattern data in the font cartridge unit. Thus, characters in addition to standard characters can be printed simply by loading the font cartridge unit to the printer main body.

DETAILED DESCRIPTION OF THE PREFERRED EMBODIMENTS

Figure 1:
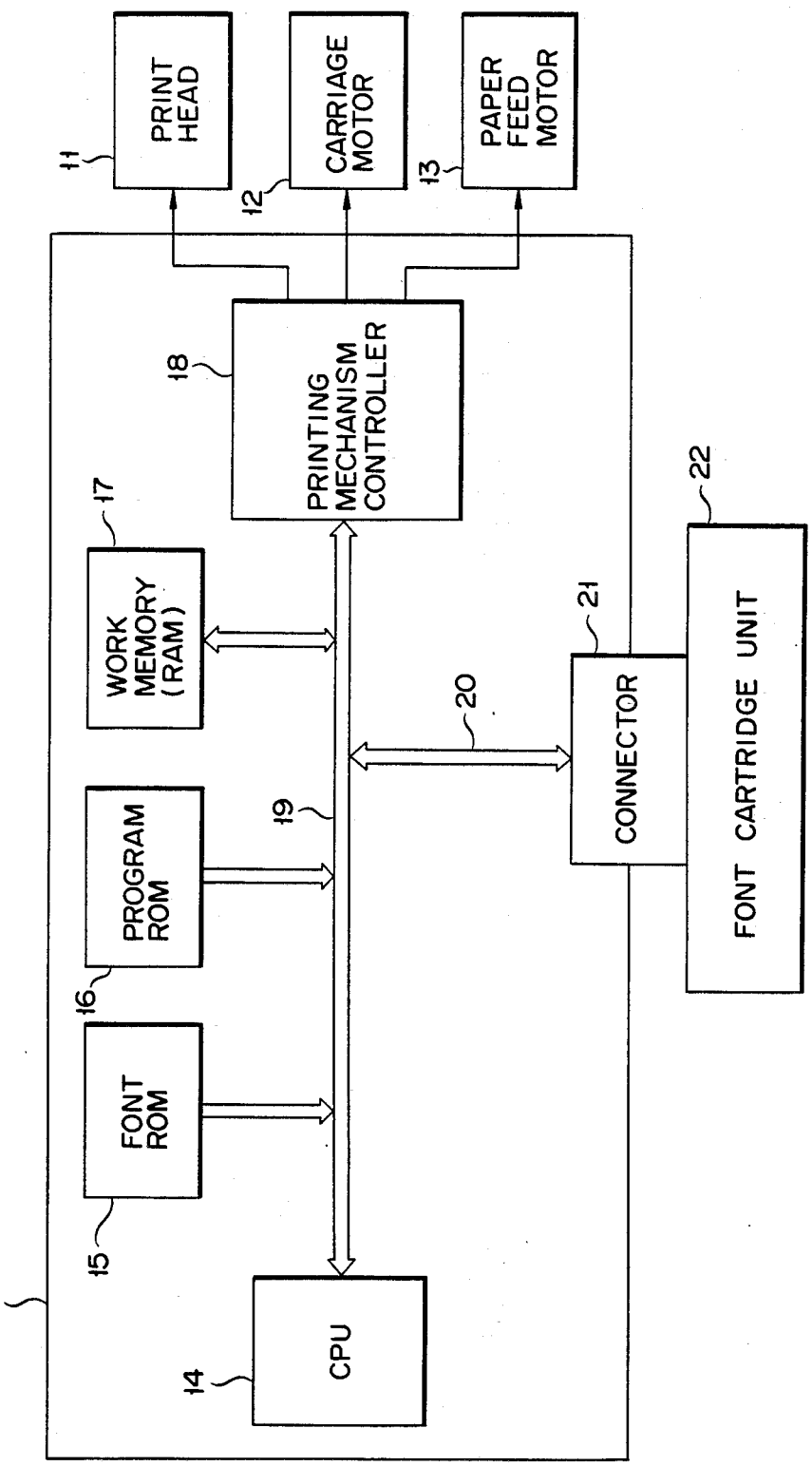
FIG. 1 is a block diagram showing an arrangement of a dot-matrix printer with a font cartridge unit according to the present invention.

An embodiment of the present invention will be described with reference to FIGS. 1 to 6. As shown in FIG. 1, a dot-matrix printer schematically comprises a printing control unit 10 and a printing mechanism. The printing mechanism comprises a print head 11, a carriage motor 12 for driving a carriage on which the head 11 is mounted, and a paper feed motor 13 for feeding paper.

The unit 10 comprises a microprocessor (CPU) 14, a font ROM 15, a program ROM 16, a read/write memory (RAM) 17, a printing mechanism controller 18 and a system bus 19. The CPU 14 is operated in accordance with a program stored in the program ROM 16 in advance so as to control the overall mechanism of the printer. The font ROM 15 stores character pattern data (font data) corresponding to standard characters. The RAM 17 is a work memory used when the CPU 14 forms print data. The controller 18 performs drive control of the print head 11, the carriage motor 12 and the paper feed motor 13 in accordance with the print data and control data supplied from the CPU 14.

A font cartridge unit 22 is connected to the unit 10 through a connector 21. The connector 21 is detachable from the unit 10, and is connected to the system bus 19 through a bus 20 when it is connected.

Figure 2:
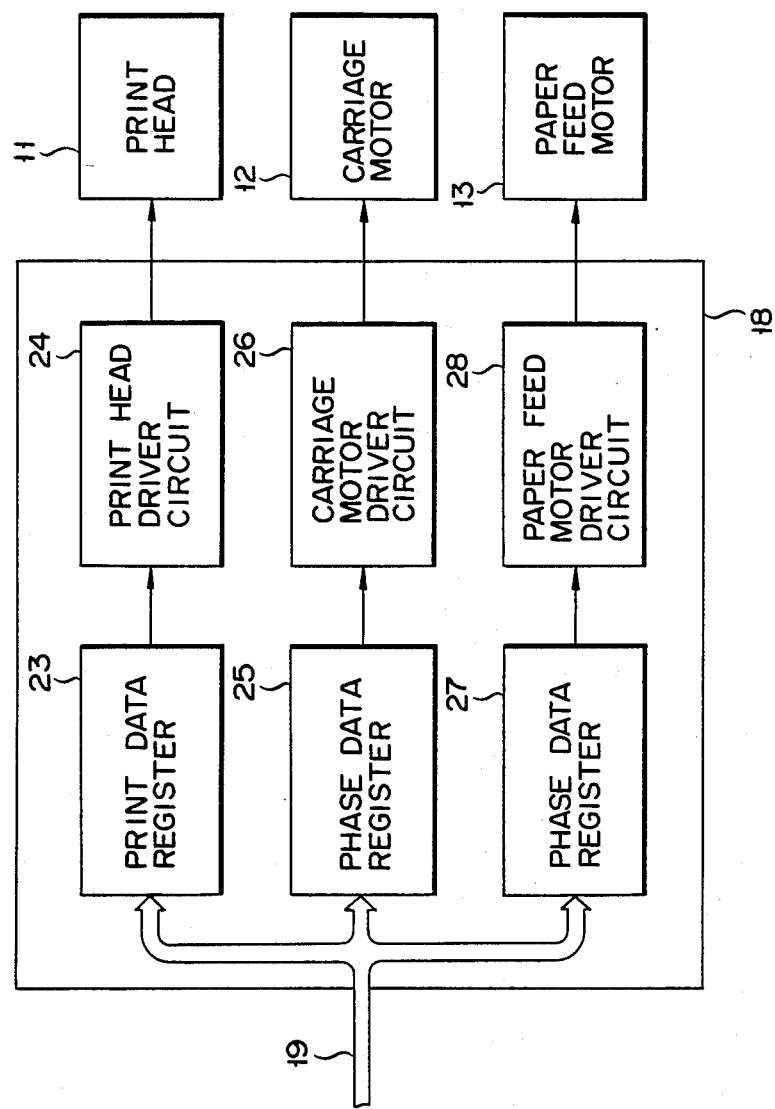
FIG. 2 is a block diagram showing an arrangement of a printing mechanism controller of the present invention.

As shown in FIG. 2, the controller 18 comprises a print data register 23 and a print head driver circuit 24 required for drive control of the print head 11. The register 23 stores the print data transferred from the RAM 17 through the system bus 19 under the control of the CPU 14. The circuit 24 selectively drives dot pins of the head 11 in accordance with the print data stored in the register 23. Note that the print data consists of character pattern data for one line.

Furthermore, the controller 18 comprises a phase data register 25 and a carriage motor driver circuit 26 required for drive control of the motor 12, and a phase data register 27 and a paper feed motor driver circuit 28 required for drive control of the paper feed motor 13. The registers 25 and 27 store the various phase data required for switching control of excitation phases of the motors 12 and 13 as stepping motors. The circuit 26 supplies an excitation current to excitation coils of the motor 12 so as to drive it. The circuit 28 supplies an excitation current to excitation coils of the motor 13 so as to drive it. The phase data is transmitted to the corresponding registers 25 and 27 through the system bus 19.

Figure 3:
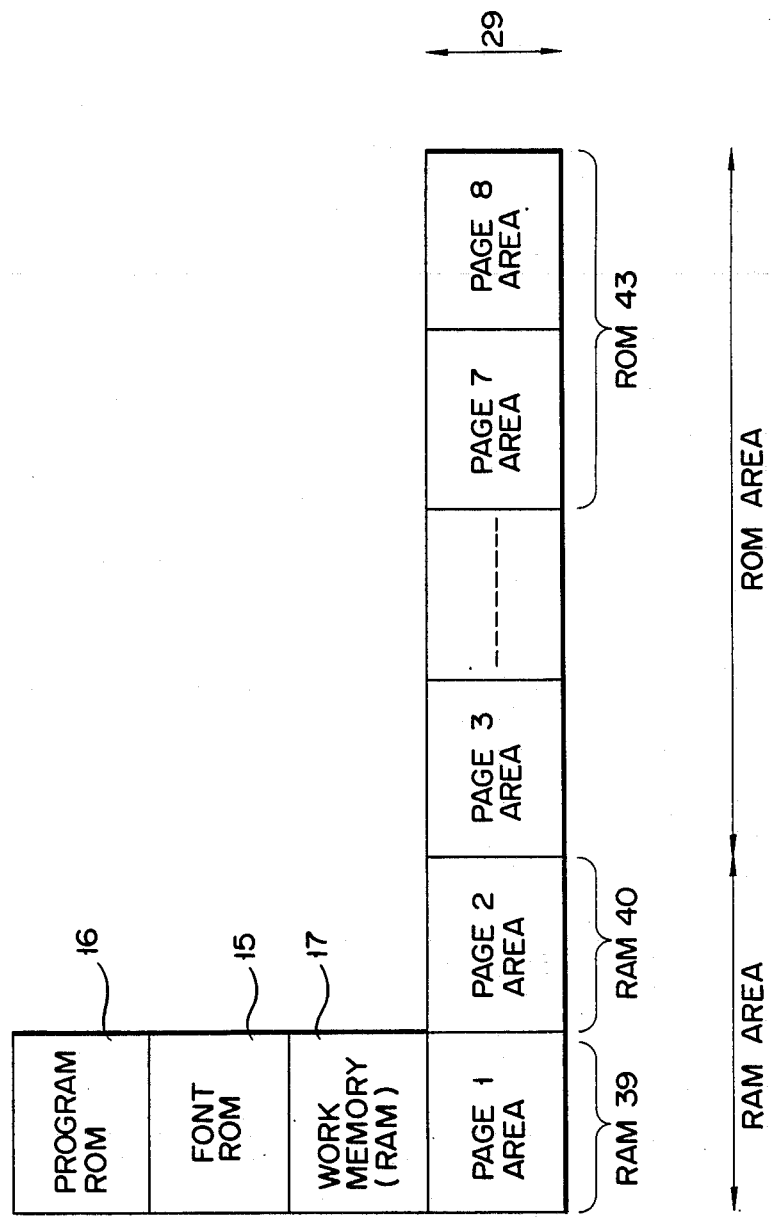
FIG. 3 is a memory map in the printer of the present invention.
Figure 4:
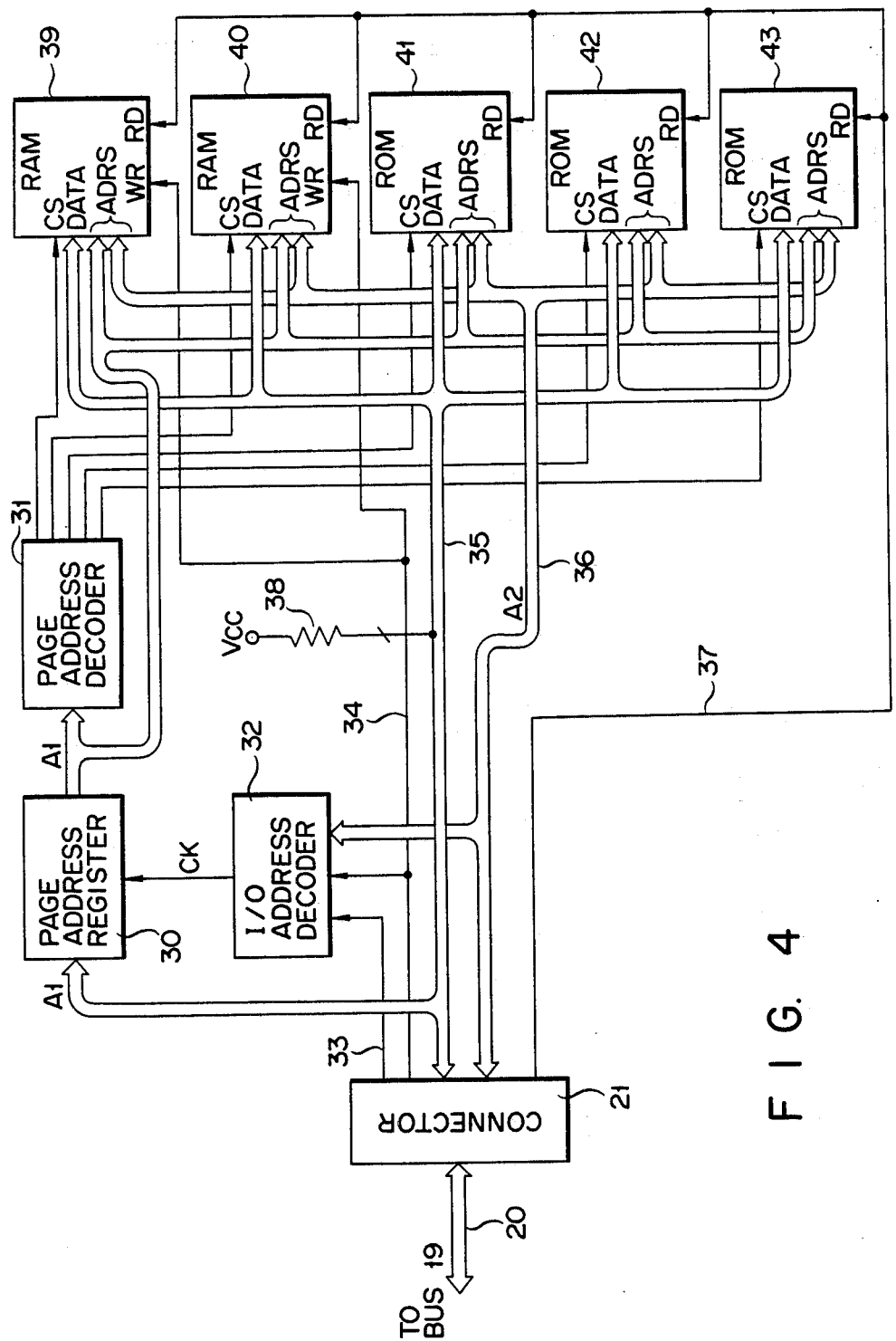
FIG. 4 is a block diagram showing an arrangement of a font cartridge unit of the present invention.
Figure 5A:
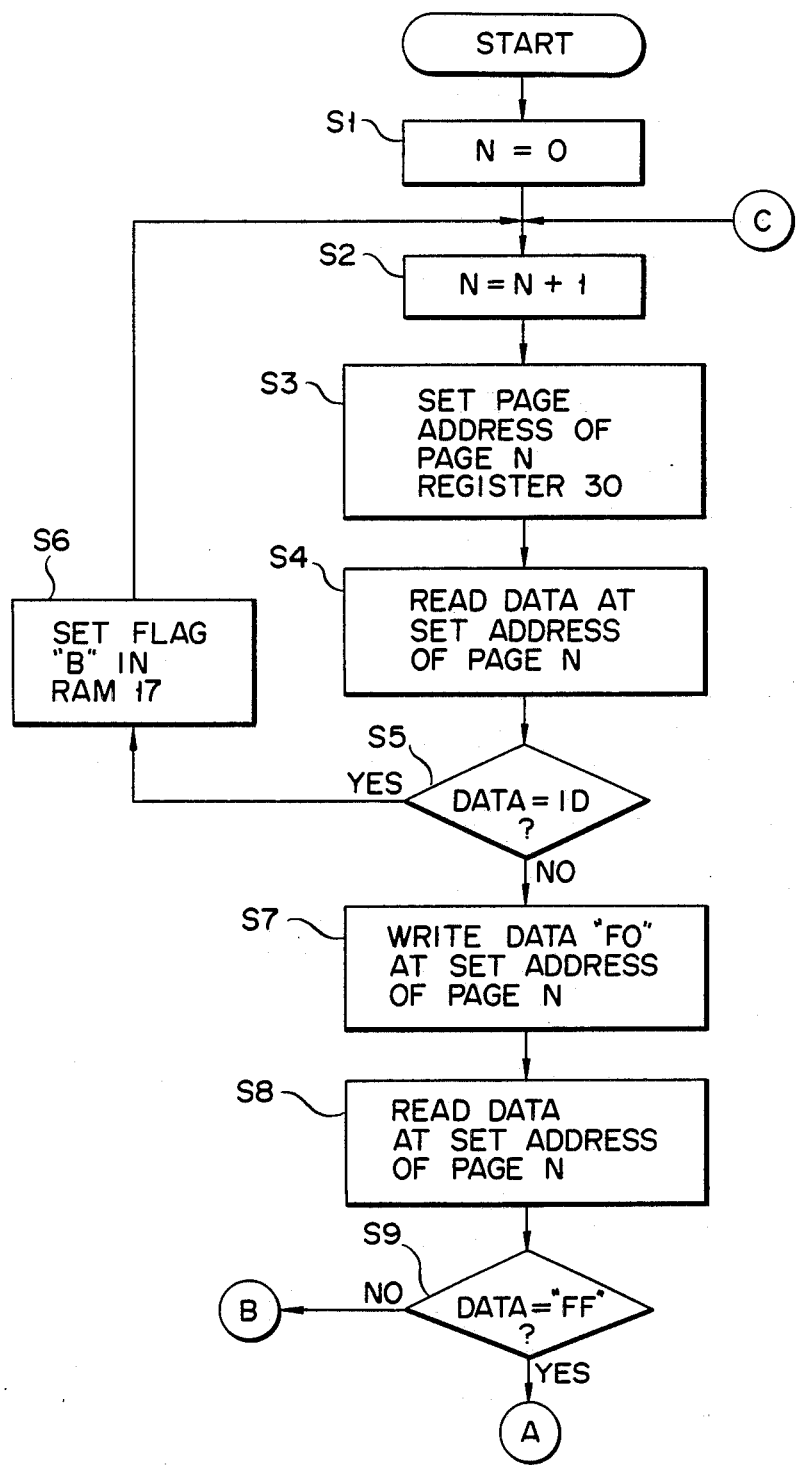
FIGS. 5A to 5C and FIG. 6 are flow charts for explaining an operation of the present invention.
Figure 5B:
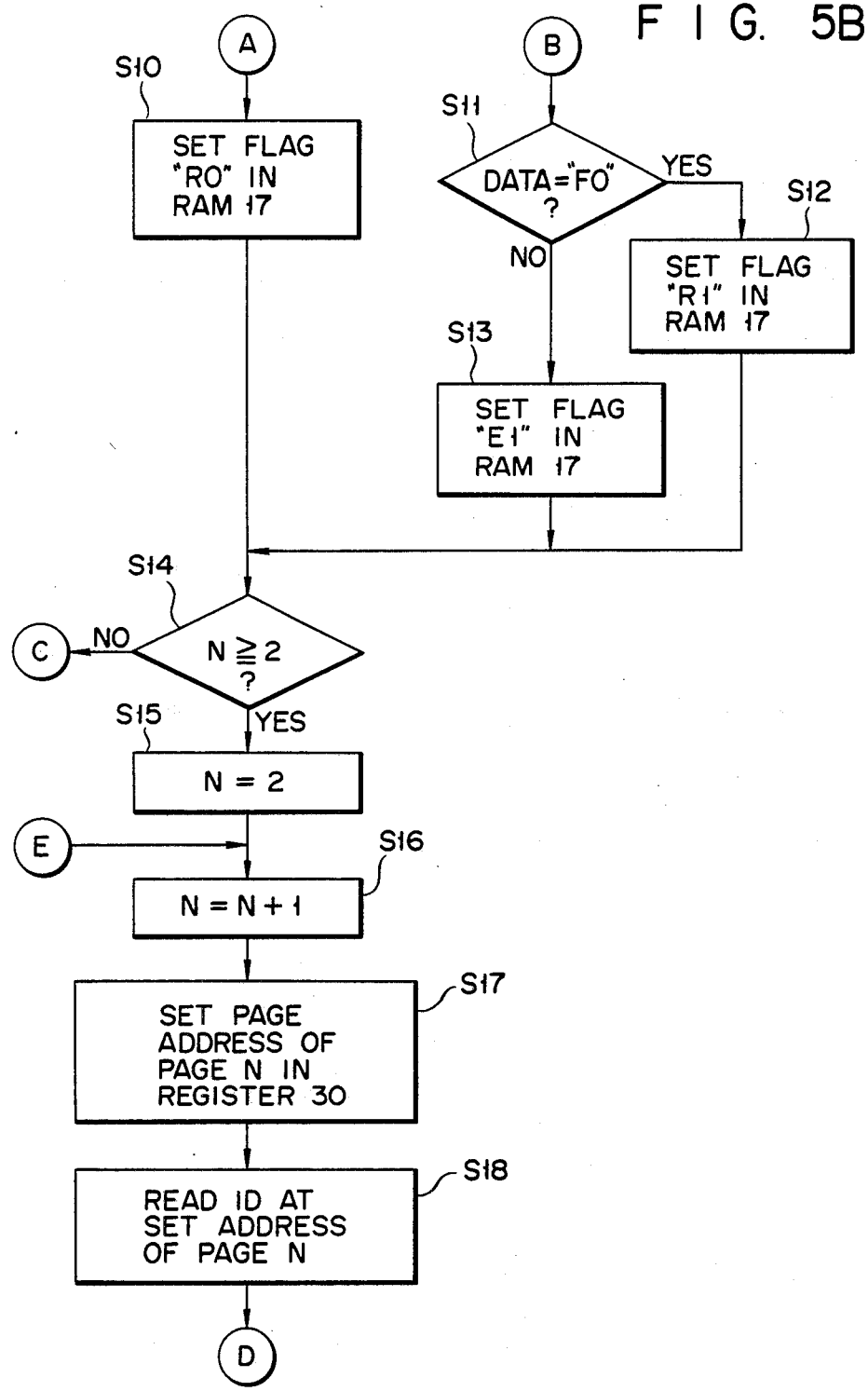
Figure 5C:
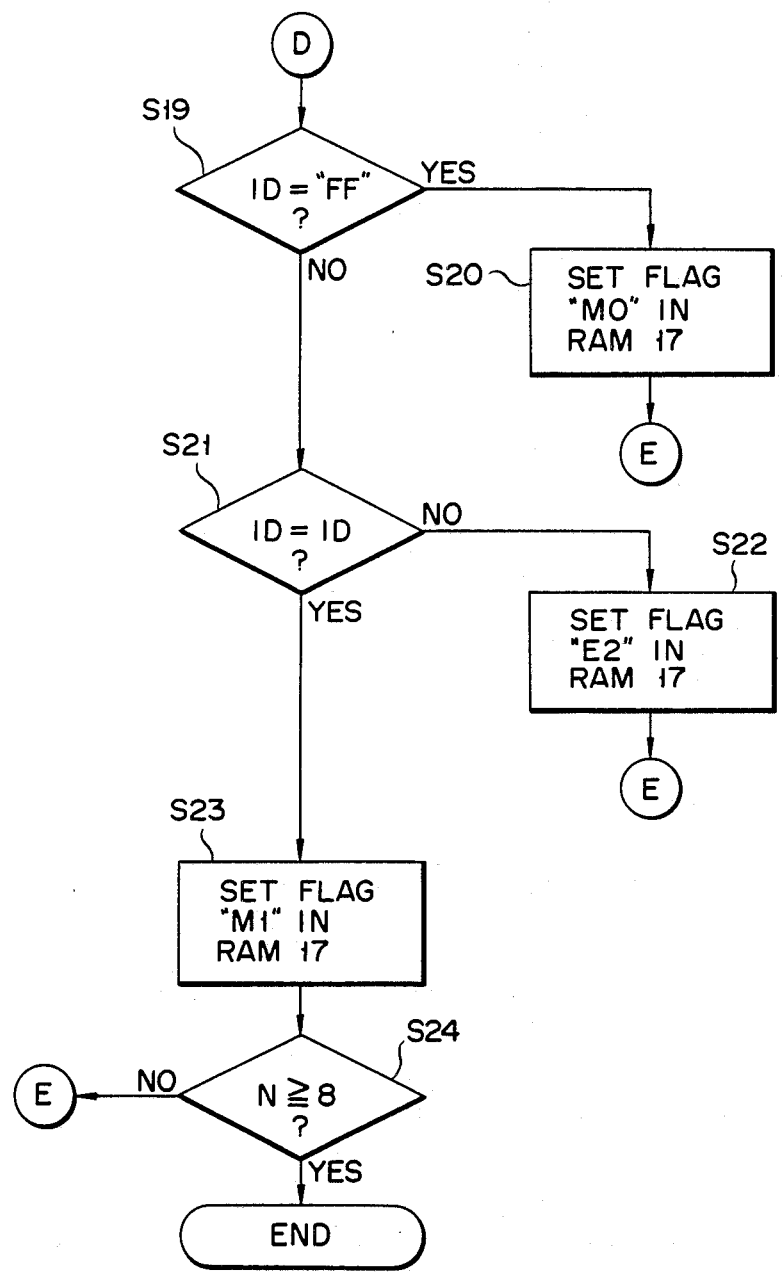

FIG. 3 shows a memory map of the printer of the present invention. A memory area accessed by the CPU 14 comprises the program ROM 16, the font ROM 15, the RAM 17 and a page area 29. The page area 29 is constituted by 8 pages, i.e., page 1 to 8 areas, and this portion is mounted in the font cartridge. Each page area stores character pattern data of one font. The CPU 14 designates pages so as to switch banks, thereby accessing one of the eight page areas. The page 1 and 2 areas constitute a RAM area mounting a RAM, and the page 3 to 8 areas constitute a ROM area mounting a ROM. The page 1 and 2 areas are used so that a central processing unit of a system in which the printer of the present invention is used transfers (down line loading) the predetermined font of character pattern data to be printed. The RAM area may or may not be backed up with a battery. As shown in FIG. 4, the font cartridge unit 22 comprises a memory group consisting of RAMs 39 and 40 and ROMs 41 to 43, a page address register 30, a page address decoder 31, and an I/O address decoder 32. The RAMs 39 and 40 have a capacity sufficient to store character pattern data of one font, respectively, and correspond to the page 1 and 2 areas. The ROMs 41 to 43 each store character patterns of two types of fonts and correspond to the page 3 to 8 areas. In this embodiment, no memory chip is mounted in the ROMs 41 and 42.

The RAMs 39 and 40 are read/write memories storing character pattern data corresponding to a predetermined font. The register 30 stores a page address transferred from the CPU 14 through the connector 21 when the predetermined character pattern data is read out from the ROMs 41 to 43 and the RAMs 39 and 40. The decoder 32 decodes an I/O address (direct address) transferred from the CPU 14 through the connector 21, and supplies a clock pulse CK required for storage operation of the register 30 to the register 30 in accordance with the decoding result. The decoder 31 decodes the page address supplied from the register 30, and supplies a chip select signal CS to the ROMs 41 to 43 and the RAMs 39 and 40 in accordance with the decoding result. The character pattern data is transferred from the ROMs 41 to 43 and the RAMs 39 and 40 to the unit 10 through an I/O bus 35. The I/O bus 35 is connected to a pull-up resistor 38 and a voltage Vcc is applied through the resistor 38.

The operation of the dot-matrix printer with the above arrangement will be described hereinafter. When the font cartridge unit 22 is loaded, a mounting state of memory elements in the entire memory area must be recognized. The operation will be briefly described with reference to the flow charts shown in FIGS. 5A to 5C. In step S1, a counter variable N is set to "0". The variable N indicates a page number being accessed. In step S2, the variable N is incremented by one. In step S3, in order to allow the CPU 14 to access a page N, a page address A1 of the page N is set in the register 30 through the buses 19 and 20, the connector 21 and the bus 35. In step S4, ID data is read out from a specific address of the page N, e.g., a start address. In this case, the CPU 14 transfers an address A2 for designating an address in the corresponding page to the decoder 32 through an address bus 36. The decoder 32 decodes the address A2 from the CPU 14 in accordance with the I/O select signal from the CPU 14, and supplies the clock pulse CK to the register 30 in accordance with the decoding result. In synchronism with the clock pulse CK, the register 30 stores the page address A1 from the CPU 14, and thereafter supplies it to the decoder 31. The decoder 31 decodes the page address A1 from the register 30, and supplies the chip select signal CS to, e.g., the RAM 39. Thus, the CPU 14 reads out the ID data from the start address of the RAM 39 using the address A2. At a start address of each page, data indicating that the page is the RAM or ROM, data indicating the font stored in the page, and the like are stored. It is checked in step S5 if the data read out from the start address of the page is the ID data. That is, since the RAM may or may not be backed up with a battery, it is checked in step S5 whether or not the RAM is backed up with the battery. If YES in step S5, i.e., if the readout data is the ID data, a flag "B" indicating that the battery backed-up RAM is mounted in the page 1 area is written in the RAM 17 in step S6, and the flow returns to step S2. If NO in step S5, predetermined data "F0" (excluding "FF" in sexadecimal notation) is written at a predetermined address, e.g., the start address of the page 1 area, and thereafter the data is read out, as shown in steps S7 through S9. Then, it is checked if the readout data is the data "FF" in sexadecimal notation. In other words, the CPU 14 supplies a write signal to the RAM 39 through a memory read/write line 34 so as to write predetermined data therein. The reason for checking in step S9 if the readout data is "FF" is to check if a memory chip is mounted in the RAM 39 corresponding to the page 1 area. If data is read out from an address at which no memory chip is mounted, since the bus 35 is pulled up, data "FF" is obtained as if data "FF" were read out. If the readout data in step S9 is "FF", it is determined that the memory chip is not mounted. In step S10, a flag "R0" indicating no RAM is mounted in the page 1 area is written in the RAM 17. If NO in step S9, it is checked in step S11 if the readout data coincides with the data "F0" written in step S7. If YES in step S11, a flag "R1" indicating that a RAM is mounted in the page 1 area is written in the RAM 17. If NO in step S11, a flag "E1" indicating that a RAM is mounted in the page 1 area but is malfunctioning is written in the RAM 17. When the above-mentioned operation is repeated until YES in step S14 is obtained, it can be detected whether or not RAMs are mounted in the page 1 and 2 areas.

If YES in step S14, the flow advances to step S15. In steps S15 through S24, it is detected whether or not a ROM is mounted in the page 3 to 8 areas in the ROM area. If YES in step S19 (if the ID data readout from the page N is the data "FF"), the flag "M0" which indicate that the ROM is not provided in the page N area, is written in the RAM 17 in step 20. If NO in step 21 (if the data readout from the page N is not the ID data), the flag "E2", indicating that the ROM provided in the page N operates erroneously, is written in the RAM 17 in step 22. If YES in step 21, the flag "M1", indicating that the ROM is provided in the page N area, is written in the RAM 17 in step 23.

After the above-mentioned detection, the CPU 14 switches memory access to the unit 22 side in accordance with a print character code supplied from the host computer. As shown in step S30 of FIG. 6, the CPU 14 sets a predetermined page address A1 corresponding to the print character code in the register 30 through the buses 19 and 20, the connector 21 and the bus 35. In this case, the CPU 14 transfers a direct address A2 for designating an address in the page to the decoder 32 through the bus 36. The decoder 32 decodes the direct address from the CPU 14 in accordance with an I/O select signal received from the CPU 14 through the control signal line 33, and supplies the clock pulse CK to the register 30 in accordance with the decoding result. The register 30 stores the page address A1 from the CPU 14 in synchronism with the clock pulse CK, and thereafter supplies it to the decoder 31. The decoder 31 decodes the page address A1 from the register 30 and the direct address A2 from the CPU 14, and supplies the chip select signal CS to, e.g., the ROM 43. Thus, as shown in FIG. 3, the ROM 43 having the storage area, e.g., page 7 and 8 areas storing high-density character pattern data corresponding to the print character code is selected.

In step S31, the CPU 14 accesses the ROM 43 using the page address A1, e.g., designating the page 7 and 8 areas and the direct address A2 designating the address in the corresponding pages, thereby reading out character pattern data constituting the predetermined high-density dot character pattern from the ROM 43. The CPU 14 supplies a read control signal RD to the ROM 43 through a memory read line 37, and reads out the character pattern data from the ROM 43 through the bus 35, the connector 21 and the buses 20 and 19.

The CPU 14 writes the character pattern data read out from the ROM 43 in the storage area of the RAM 17 designated by the direct address A2, in step S32. The CPU 14 repeats the read operation of the character pattern data from the ROM 43 until the character pattern data for one character is read out and is stored in the RAM 17. This processing is repeated in accordance with discrimination of step S33 until the character pattern data for one character is read out from the ROM 43 and is stored in the RAM 17. Furthermore, the CPU 14 repeats the read operation from the ROM 43 in accordance with discrimination of step S34 until the character pattern data for one line is developed in the RAM 17. When the character pattern data for one line is developed in the RAM 17, the CPU 14 determines whether or not necessary character pattern data is stored in the storage area of the ROM 43 corresponding to the current page address (step S35). If this determination shows that the necessary character pattern data is not stored in the storage area corresponding to the current page address, the CPU 14 performs processing for switching the page addresses (step S36). The CPU 14 switches the page address corresponding to, e.g., the page 7 area to that corresponding to, e.g., the page 8 area, and sets it in the register 30 shown in FIG. 4. Thus, the CPU 14 reads out the character pattern data stored in the page 8 area of the ROM 43, and stores it in the RAM 17.

In this manner, when a print character code corresponding to characters other than standard characters is transmitted from the host computer, the CPU 14 reads out, e.g., the high-density character pattern data corresponding to the print character code from the ROM 43 of the unit 22. When the high-density chracter pattern data for one line read out from the ROM 43 is developed in the RAM 17, the CPU 14 executes the printing operation in step S37. The CPU 14 supplies the print data including the character pattern data from the RAM 17 to the controller 18 in the same manner as in the dot printing operation of standard characters. The controller 18 controls the head 11 in accordance with the high-density character pattern from the register 23 shown in FIG. 2. Thus the head 11 prints a character corresponding to the high-density character pattern data on the paper sheet.

Figure 6:
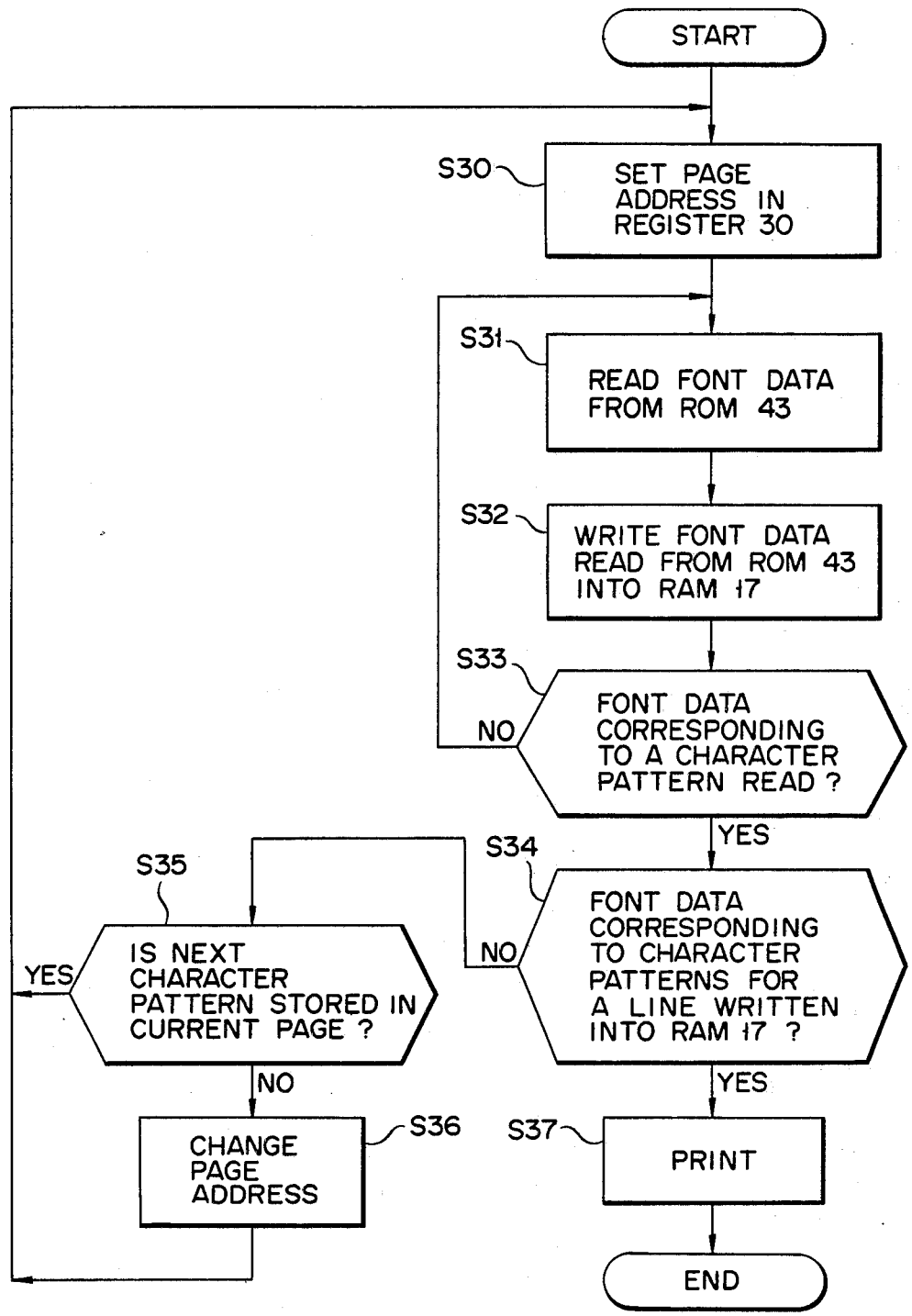

The CPU 14 recognizes a memory arrrangement in the unit 22 with respect to the ROMs 41 to 43 and the RAMs 39 and 40 in which a storage area is divided into page areas. Thus, the CPU 14 executes printing processing, e.g., as shown in FIG. 6 if the arrangement of the memory group in the unit 22 is as shown in FIG. 4. If the ROM 43 shown in FIG. 4 is not mounted, the CPU 14 interrupts readout of the character pattern data from the ROM 43, and executes processing indicating that printing of the character pattern data stored in the ROM 43 cannot be performed. When the RAMs 39 and 40 are not present, the CPU 14 interrupts the read/write operation with respect to the RAMs 39 and 40, and executes processing indicating that printing of character pattern data stored in the RAMs 39 and 40 cannot be performed.

According to the present invention, the CPU 14 at the printer side can recognize the storage area (page area) corresponding to the predetermined character pattern data in accordance with the arrangement of the memories in the unit 22. For this reason, when the ROMs 41 to 43 and the RAMs 39 and 40 are present in the unit 22 and the arrangement thereof is unknown, the CPU 14 at the printer side can recognize the storage area corresponding to the predetermined character pattern data. Therefore, characters other than the standard characters can be printed simply by loading the font cartridge unit to the printer main body.

What is claimed is:

1. A dot-matrix printer with a font cartridge unit comprising:

a font cartridge unit comprising a plurality of memory means, each of said memory means having a memory area divided into a plurality of page areas, for storing different character pattern data in the respective page areas, and a data transfer bus for bidirectionally transferring character pattern data to and from said memory means;

detecting means for accessing a predetermined address of each page area of each of said memory means of said font cartridge unit through said data transfer bus to access specific data to detect whether said memory means corresponding to the respective page areas are mounted in said font cartridge unit;

print control means for forming print data in accordance with character pattern data read out from said memory means detected by said detecting means to be mounted in said font cartridge unit;

connector means having a detachable structure for connecting and disconnecting said data transfer bus to each of said font cartridge unit, said detecting means, and said print control means, such that when said data transfer bus is connected to said print control means and said font cartridge unit by said connector means, character pattern data stored in said memory means is transferable between said data transfer bus and said print control means and said specific read data stored in said memory means is transferable between said data transfer bus and said detecting means; and print means for executing a dot-print operation in accordance with said print data formed by said print control means.

2. A printer according to claim 1, wherein said memory means comprises read/write memories and said detecting means comprises a microprocessor said specific data at a specific address of a specific page area of each of said memory means of said font cartridge unit, for reading said written specific data, and for comparing said written specific data and said read specific data to detect whether said read/write memories are mounted in said font cartridge unit if said written specific data and said read specific data are equal.

3. A printer according to claim 1, wherein said memory means comprises read only memories and said detecting means comprises a microprocessor for retrieving specific read data from said read only memories and for detecting whether said read-only memories are mounted at positions corresponding to specific page areas if said specific read data are retrieved in response to the access of a specific address of the specific page areas of said read only memories of said font cartridge unit.

4. A printer according to claim 1, wherein said data transfer bus is connected to a pull up resistor, and a predetermined voltage is applied to said data transfer bus through said pull-up resistor.

5. A printer according to claim 2, wherein said detecting means includes means for determining if said memory means are backed up with a battery from said predetermined specific read data accessed from said specific address of said specific page areas.

6. A printer according to claim 4, wherein said detecting means comprises a microprocessor for detecting that neither a read-only memory nor a read/write memory is mounted at a position corresponding to said specific page area if said pull-up resistor has applied said predetermined voltage to said data transfer bus when the specific address of each of the specific page areas of said memory means of said font cartridge unit is accessed.

7. A printer according to claim 1, wherein said font cartridge unit has a memory area divided into a plurality of page areas, and the respective page areas are grouped into read-only memory areas and read/write memory areas.

8. A printer according to claim 7, wherein said detecting means comprises a microprocessor for writing specific data at a specific address of a specific page area of each of said read/write memory areas of said font cartridge unit, for reading said written specific data, for comparing said written specific data and said accessed read specific data, and for detecting that a read/write memory is mounted at a position corresponding to a specific page area if said written specific data and said read specific data are equal.

9. A printer according to claim 7, wherein said detecting means comprises a microprocessor for selectively retrieving data from said read-only memory areas and for detecting that a read-only memory is mounted at a position corresponding to a specific page area if predetermined specific read data is retrieved from said specific address of said specific page area of said read-only memory area of the font cartridge unit.

10. A printer according to claim 8, wherein said detecting means includes means for determining if said memory means are backed up with a battery from said predetermined read specific data accessed from said specific address of said specific page areas.

11. A printer according to claim 7, wherein said data transfer bus is connected to a pull-up resistor, and a predetermined voltage is applied to said data transfer bus through said pull-up resistor.

12. A printer acording to claim 11, wherein said detecting means comprises a microprocessor for detecting that neither a read-only memory nor a read/write memory is mounted at a position corresponding to the specific page area if said data transfer bus is at said predetermined voltage when the specific address of the specific page area of said font cartridge unit is accessed.

* * * * *